United States Patent [19]

Krenkel et al.

[11] Patent Number: 6,042,935
[45] Date of Patent: Mar. 28, 2000

[54] FRICTION ELEMENT

[75] Inventors: Walter Krenkel, Ludwigsburg; Richard Kochendorfer, Stuttgart, both of Germany

[73] Assignee: Deutsche Forschungsanstalt fuer Luft-ung Raumfahrt e.V., Cologne, Germany

[21] Appl. No.: 08/836,024

[22] PCT Filed: Oct. 17, 1995

[86] PCT No.: PCT/EP95/04080

§ 371 Date: Jul. 23, 1997

§ 102(e) Date: Jul. 23, 1997

[87] PCT Pub. No.: WO96/13471

PCT Pub. Date: May 9, 1996

[30] Foreign Application Priority Data

Oct. 28, 1994 [DE] Germany ............................ 44 38 456

[51] Int. Cl.$^7$ .......................... C04B 35/573; C04B 35/80; F16D 69/02

[52] U.S. Cl. ...................... 428/307.7; 156/329; 156/335; 192/107 M; 228/121; 228/175; 228/176; 228/262.7; 260/998.13; 423/447.2; 427/228; 427/383.7; 428/293.4; 428/317.7; 428/317.9; 428/319.1

[58] Field of Search .......................... 428/293.4, 293.7, 428/312.8, 307.7, 316.6, 317.7, 317.9, 319.1; 156/335, 329; 188/71.5, 73.2, 251 A; 192/107 M; 228/121, 175, 176, 262.7; 260/998.13; 423/447.2; 427/228, 229, 247, 372.2, 383.7

[56] References Cited

U.S. PATENT DOCUMENTS

| 3,712,428 | 1/1973 | Marin | 188/251 A |
|---|---|---|---|
| 3,759,353 | 9/1973 | Marin | 188/71.5 |
| 3,859,160 | 1/1975 | Marin | 161/42 |
| 3,867,491 | 2/1975 | Marin | 264/29 |
| 4,742,948 | 5/1988 | Fisher et al. | |

FOREIGN PATENT DOCUMENTS

| 0051535 | 5/1982 | France . |
|---|---|---|
| 2130433 | 2/1972 | Germany . |
| 3540290 | 5/1986 | Germany . |
| 4127113 | 2/1993 | Germany . |
| 1457757 | 12/1976 | United Kingdom . |
| 2137975 | 10/1984 | United Kingdom . |

OTHER PUBLICATIONS

Entwicklung Integraler Leichtbaustrukturen Aus Faserkeramik, by Walter Krenkel, Volkmar Dollhopf und Frank Kocian, DLR–Stuttgart, published at the VDI Werkstofftag '94, Leichtbau–Strukturen und Leichtebauteile, in Duisburg, 9./10.3.1994.

Patents Abstracts of Japan, M–1354 Jan. 19, 1993, vol. 17/No. 26, Frictional Member, JP 4–249627 (a), Sep. 4, 1992, Sumitomo Electric Ind. Ltd., Masatake Sakagami.

*Primary Examiner*—Blaine Copenheaver
*Attorney, Agent, or Firm*—Fulbright & Jaworski, LLP

[57] ABSTRACT

Disclosed is a friction element designed for frictional contact with a body and for use, in particular, in brakes or clutches. The friction element has at least one freely accessible surface formed by a carbon-fiber-reinforced porous carbon block, at least some pores of which are filled with silicon and silicon carbide. In order to provide a friction element of this kind, as well as a method of manufacturing the friction element, which gives the advantages associated with C/C—SiC materials and which can be manufactured inexpensively, thus making it suitable, from the cost point of view, for general use particularly in the automobile-construction industry, the friction element is made up of at least one core element and at least one friction block securely bonded to it, the friction block being bonded to the core element on the side remote from its friction surface and the two elements being joined to each other by a high-temperature-resistant bonding layer.

49 Claims, 5 Drawing Sheets

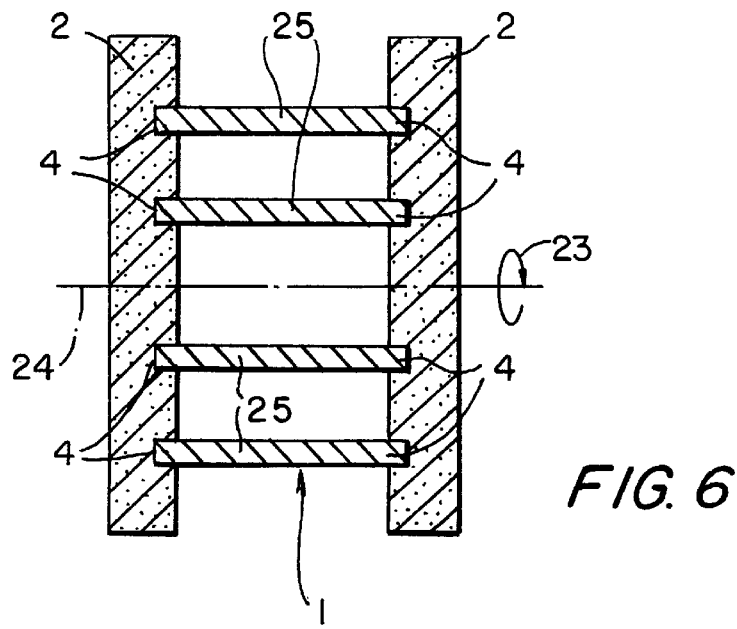
FIG. 6
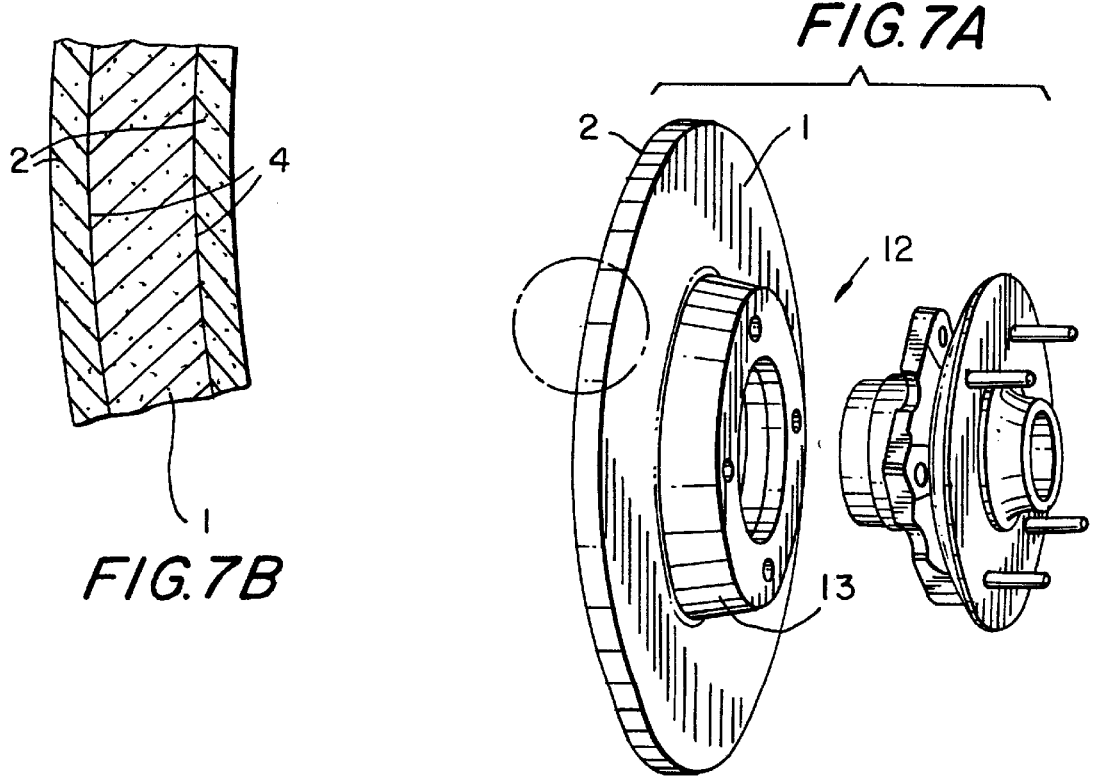
FIG. 7A
FIG. 7B

FRICTION ELEMENT

BACKGROUND OF THE INVENTION

The present invention relates to a friction unit for frictional engagement with a counter-body, especially a brake or clutch body, having at least one freely accessible friction surface which is formed of a carbon fiber-reinforced, porous carbon body whose pores are at least partially filled with silicon and silicon carbide.

The invention furthermore relates to a method for manufacturing a friction unit for frictional engagement with a counter-body, especially brake or clutch bodies, wherein a carbon fiber reinforced, porous carbon body is prepared and infiltrated with fluid silicon at a temperature in the range from 1410° C. to 1700° C. in a controlled atmosphere.

Such friction units and method for their manufacture were presented by a work group of the DLR (Deutsche Forschungsanstalt für Luft- und Raumfahrt e.V.), Stuttgart, Institut für Bauweisen- und Konstruktionsforschung, at the 1994 VDI Materials Convention in Duisburg on Mar. 9–10, 1994, the theme of which was lightweight structures and lightweight components, in the framework of the lecture entitled "Development of integral lightweight structures of ceramic fiber." In this lecture, a technology for manufacturing carbon fiber-reinforced carbons was presented. The carbon fiber-reinforced carbons are infiltrated with fluid silicon by a so-called "fluid silicification method" and subjected to a heat treatment, wherein the silicon is converted with carbon to SiC. One possible application of these C/C—SiC materials is, among others, brake disks.

Increasingly severe requirements are being made of brakes, especially in motor vehicle and aircraft construction. The speeds which are attained nowadays by such vehicles are constantly increasing. When brakes are applied, the kinetic energy is converted by friction to heat, which is absorbed by the brake disk and the brake linings. A brake system of this kind is accordingly limited by the friction characteristics of the brake material and its ability to store and remove heat. In general, brake materials must have very good thermomechanical properties, high and constant friction characteristics and good resistance to abrasion. Ordinary brake disks of cast iron or steel, which are today used in ordinary automobile construction, permit temperatures of approximately 650° C. Brakes of carbon fiber-reinforced carbon materials (C/C) developed in recent years, such as those described for example in DE-A1 3 24 200, allow temperatures up to 100° C., combined with a weight reduction in comparison with cast-iron brake disks.

Such carbon brake disks have in the meantime been adopted and established in race car construction and aircraft construction. What is problematic in this case is, in addition to a number of tribological properties, the high cost factor involved in the brake disks, which presently is accepted in the field of race car and aircraft construction, but cannot be accepted for general vehicle construction.

At the above-described VDI presentation, a C/C—SiC material was exhibited, as stated above, which shows decided advantages over a C/C material, especially in regard to thermal shock resistance, oxidation resistance, moisture absorption and frictional performance.

Setting out from the state of the art described above, the present invention is addressed to the problem of devising a friction unit as well as a method for the manufacture of such a friction unit, in conjunction with which the advantages are achieved which are associated with C/C—SiC materials, which can be manufactured at a reasonable cost, so that such friction units are economically feasible especially for general vehicle construction.

The above-stated object is obtained by a friction unit formed of at least a core body and at least a friction body fixedly joined thereto, the friction body being joined to the core body on its side facing away from the friction surface, and both bodies being joined together as intimately as possible by a refractory bonding layer.

In another aspect, the invention is in a method wherein at least one additional body is prepared which is joined to the silicon-infiltrated body by a refractory bonding layer, the carbon body forming a friction body and the other body forming a core body.

The basic idea of the invention lies in making such a friction unit of a plurality of parts, so that the individual areas of a friction unit can be adapted in use to particular requirements. A friction unit of this kind is divided into at least one core body and at least one friction body, the latter being formed of carbon fiber-reinforced, porous carbon bodies whose pores are at least partially filled with silicon and silicon carbide, and these two bodies are joined together in a single unit. The friction body can be adapted to desired requirements in its quality, i.e., its friction coefficient and its abrasion resistance. The core body, however, is constructed such that it is suitable on the one hand as a support for the friction body, i.e., it has a high mechanical stability, can still contain accommodating parts, adapter parts and joining parts in order to secure it on a stationary or rotating unit, and lastly it is adapted in its material properties such that it absorbs the heat well and quickly dissipates it. Furthermore, this multi-partite bonded construction offers the possibility of joining the remanent core body to a fresh friction body. The reuse of the core body considerably reduces the cost of such a friction unit by the simple replacement of the worn-out, abraded part. Furthermore, the costs can be reduced in mass production by subdividing a friction unit into the individual bodies, i.e., core body and friction body, with the adapted material properties, especially if such friction units have to be textured. For this purpose no complicated after-working procedures are necessary, since the parts of the friction unit, i.e., the core body and the friction body, are produced and shaped individually and only then are they joined together at a common, smooth or possibly toothed joining surface. The technique of producing C/C—SiC bodies, which will be explained hereinafter, makes it possible to preform and profile such parts in a "green" state, then infiltrate with fluid silicon, and ceramicize the part in a heat treatment. The compacts are very easy to shape while they are in the green state. For example the core body can be provided with appropriate shapes for fastening, and holding means can be incorporated into these core bodies. In contrast, the friction coating, in its simplest version, can be made in the form of a circular disk smooth on both sides. Any ventilation openings within such a friction unit can be incorporated either into the face of the core body that is later to be joined to the friction body, or else it can be incorporated in the junction surface of the friction body. Therefore, in the present invention, a simple functional separation of the expensive friction volume and the inexpensive core volume is achieved. Furthermore, the invention permits optimization of the mechanical and thermal properties associated with the friction volume and the core volume. It has been found that, in order to join the two bodies, i.e., the core body with the friction body, it is not necessary to use dissimilar materials. Instead, a joining layer is used which contains substantially silicon carbide. There are different possibilities for joining the two bodies. In one aspect, in the manufacture of a new friction unit from a core body and at least one friction body, the two bodies can advantageously be prepared as carbon fiber-reinforced, porous carbon bodies and then infiltrated with silicon, and these two bodies are joined together at the joining layer after heat treatment. Another possibility is for the two bodies to be prepared in the form of ceramicized starting bodies already filled with silicon and silicon carbide. These two starting bodies are placed one on the other at their joining surfaces and the gap is filled with silicon. For this purpose a technique is preferred in which this gap is infiltrated with silicon and then the entire unit is subjected to a heat treatment using temperatures ranging from 1410° C. to 1700° C. Such a technique of bonding two finished bodies is to be used whenever a worn-out friction unit, in which only a thin layer of the friction body remains, is renovated with a new friction body. To promote the infiltration of the fluid silicon in the area of the bonding layer, an insert of porous, pyrolyzable material on a cellulose basis can be interposed between the friction body and the core body prior to the infiltrations. Preferably this insert consists of paper, cardboard and/or paper felt with a high porosity, the thickness ranging preferably from 0.1 to 1 mm. Such an insert is then infiltrated with fluid silicon and then the prepared unit is subjected to the heat treatment. To accelerate the infiltration and render it more uniform in the insert, a pressure gradient can be produced and sustained during infiltration in the area of the layer being formed, for example by applying a vacuum.

A carbon fleece or a carbon mat can also be used as the insert. Preferably, with such an insert, any differences in the gaps in the junction area are evened out. The material on a cellulose basis is especially suitable for this purpose. An insert of carbon mat or of a fiber material containing carbon is when the direction of flow and velocity of flow in the gap are to be influenced. It is certainly to be stressed at this point that the two materials mentioned as insert react after infiltration with liquid silicon and the heat treatment to form SiC, and thus an insoluble bond is formed. Such a procedure for bonding the two bodies is to be selected whenever a friction unit is to be provided at some time with a new friction body without completely removing the old friction body in any way.

Normally, no insert is used, but only a defined gap of 0.1 to 0.5 mm is left between the friction body and the core body. Fluid silicon is introduced into this gap and ceramicized. In the ceramicized state the bonding layer then contains substantially silicon, which can be liquefied by reheating to the melting temperature (1420° C. for silicon), so that the friction body and core body can be separated again from one another. The silicon serves in this case as a hard solder.

From the above description it can be seen that, with the procedure described, repeatedly built-up or multi-layer friction units can be made, and a core body can be joined to a friction body on two opposite sides by means of a bonding layer containing mostly silicon carbide on each. Furthermore, core bodies and friction bodies can be joined alternately with one another in order to form a multi-layer friction unit, the individual friction bodies protruding past the circumference of the core body, so that the friction surfaces of the friction bodies can be accessible from the exterior. With this modular-like build-up it is necessary only to stock friction bodies and core bodies in order then to join them together in the desired order. The friction bodies can be of the variety which subsequently can be applied to a core body when the original friction body is worn out.

The core body should preferably have a porosity of 5 to 50%, and especially a porosity ranging from 10 to 30%. These pores are then infiltrated with silicon which is converted by heat treatment to silicon carbide. The residual porosity should amount to less than 10% in order to make this core body mechanically stable yet at the same time elastic enough to satisfy requirements as supports when used as a clutch or brake unit.

To increase the thermal conductivity of the friction body and/or core body, care must be taken that carbon fibers are present in the direction of the thickness in the amount of 3 to 10% of the total fiber content. This can be achieved by using three dimensional fiber skeletons or by sewing together two-dimensional fabrics with carbon sewing threads.

In order to adapt the friction body to its requirements in use, additives reducing or increasing friction are embedded in the carbon fiber-reinforced, porous carbon bodies. For example, boron nitride and/or aluminum phosphate are embedded into the pores as friction reducing additives, while a silicon carbide powder with a grain size of 0.3 to 3.0 $\mu$m, for example, is embedded as a friction increasing additive. The friction coefficient is increased by additives increasing the friction value. The friction increasing additive in the form of silicon carbide powder has the advantage that this powder can be embedded in the friction body at particular points at which an increased friction value is desired.

Of course, it has been found that friction bodies as described above tend to be very noisy, i.e., to squeal, under certain conditions of their use. Such noise is not acceptable in passenger car construction. For this reason the embedding of friction reducing additives in the form of the above-mentioned boron nitride and/or aluminum phosphate is helpful, making it possible to prevent such squealing.

It is also conceivable for the friction body to contain different additives in different places, i.e., a friction-increasing additive in one area and a friction reducing additive in another, for example in consideration of the different angular velocities of different areas of a disk-shaped, rotating friction body.

The core body can be made most economically of porous carbon or at least partially of carbon fibers. By the use of these materials in the core body the costs of the core bodies can be reduced. If the entire core body is formed of carbon fibers, the individual layers of the fibers can be stacked one on the other or wound, and the orientation of the fibers in adjacent layers can be different, oriented or unoriented. Preferably the fiber length is between 1 and 10 mm, so that a preliminary body will result, having a well-crosslinked, porous structure, which is then infiltrated with silicon. On the other hand, the core body can also be formed of silicon carbide or a mixture of silicon carbide and graphite. In the form of silicon carbide, a cheap material is used, which furthermore has a high thermal conductivity and accordingly satisfies the requirements of a core body.

Preferably, the content of the bonding layer of silicon carbide in the finished friction unit is above 50%. Thus a good heat transfer is achieved between the friction unit in which the heat is produced and the core body which is to store and remove the heat.

It is a preferred embodiment to form a bonding layer which has a slurry added which consists of an organic binding agent with a residual carbon content of at least 40% and a fine powder of carbon and/or silicon, the binding agent content amounting to between 10 and 50%. Phenol, for example, can be used as the binding agent. This allows the amount of carbon powder added to be kept low while obtaining a high yield of SiC.

The production of a C/C—SiC body can be summarized briefly as follows:

First a pore-free and homogeneous carbon fiber-reinforced carbon body is produced as a preliminary body, consisting of carbon-rich polymers as matrices and endless fibers. In the second production step the thermal conversion of the matrix to glasslike carbon is performed by pyrolysis, which results in a carbon fiber-reinforced, porous carbon body with translaminar channels. In the third production step fluid silicon is infiltrated into the pores, and reacts under heat with the carbon of the matrix to form silicon carbide. All production steps are performed only once, in contrast to other known processes. The result is a dense structure consisting of high-strength carbon fiber clusters and oxidation-inhibiting silicon carbide protective layers surrounding the fiber clusters.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

FIG. 6 is a sectional representation of an additional embodiment of a friction unit having two friction bodies joined together by four core bodies;

FIG. 7 is a perspective, exploded view of a brake disk according to the invention, having a profiled receiving side as well as an adapter on the vehicle side.

DESCRIPTION OF PREFERRED EMBODIMENT

Figure 3:
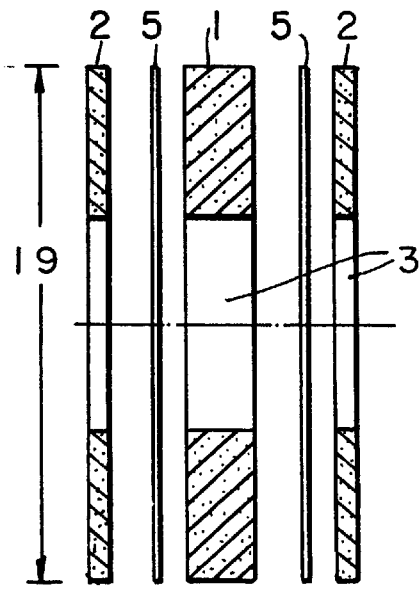
FIG. 3 is a schematic representation of a core body and two friction bodies in section prior to their assembly having an external configuration corresponding to FIG. 1.
Figure 4:
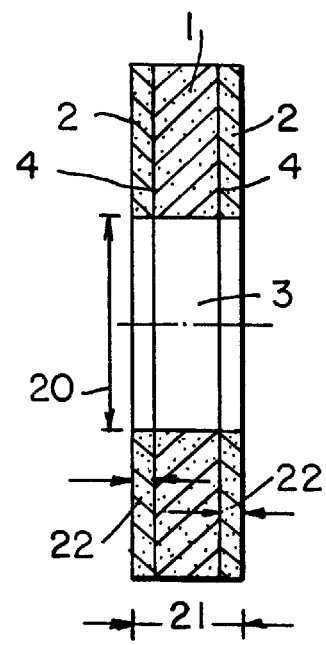
FIG. 4 depicts the individual bodies of FIG. 3 after assembly.

A friction unit according to the invention, for use as a brake or clutch body, as shown in FIGS. 1 and 7, is represented in FIGS. 3 and 4. This friction unit has a core body 1 as well as two friction bodies 2. Such bodies 1 and 2 are made in the form of flat disks with a central opening 3. The core body 1 and the friction body 2 are, according to FIG. 3, made from a carbon fiber-reinforced, porous carbon body which is infiltrated with fluid silicon at a temperature ranging from 1,410° C. to 1,700° C. in an adjusted atmosphere. These bodies 1 and 2 thus prepared are then joined together by a bonding layer 4, in the arrangement represented in FIG. 4, in which the two friction bodies lie each with a face against the core body 1 and the individual apertures 3 are aligned with one another. The bonding layer 4 is one containing substantially silicon carbide. The individual prepared bodies 1 and 2 are placed face to face in a conditioning unit, and fluid silicon is infiltrated into the gap between the individual bodies 1 and 2, and then ceramicized. In case the faces of the core body 1 and the two friction bodies 2 that are to be joined together have too great a gap at the junction, an insert 5, as indicated in FIG. 3, consisting of a porous, pyrolysable material on a cellulose basis, is interposed, preferably one made of cardboard or a paper felt with a high porosity. This insert should have a thickness between 0.1 and 0.5 mm. After the infiltration this insert 5 is burned in the pyrolysis and completely converted to carbon and to SiC with the infiltrated silicon. Since the bonding layer of SiC is similar in nature to the SiC filling the pores of the friction body 2 and core body 1, a high-strength bond is achieved between the individual parts; the strength of the unit at the junction is the total strength of the friction unit.

A carbon fleece or a carbon mat can be used as the insert 5. Also it is possible to the two bodies together in a positive manner, for example by pinning them with pins of carbon or SiC.

Preferably, the bonding layer 4 contains a slurry which is formed of an organic binding agent with a residual carbon content of at least 40% and a fine powder, grain size 1 to 10 μm, of carbon and/or silicon, the binding agent amounting to between 10 and 50%. The content of the binding agent is preferentially in the lower percentage range. Such a bonding layer is characterized by the fact that the parts to be joined are tightly affixed to one another prior to the ceramicization and the content of free silicon can be minimized.

This multi-layer structure of a friction unit of this kind offers the possibility of matching the properties of the materials of the core body 1 and the friction body 2 to the service for which they will be used. The core body 1 can be made such that it is mechanically stable and has a high heat capacity and thermal conductivity, and is furthermore inexpensive to manufacture. For example, to this end the core body is not made of a fiber body, but for cost reasons it is made of carbon or SiC. In the case of a carbon fiber-reinforced carbon body as starting material, the latter has a porosity of 5 to 50%, preferably of 10 to 30%, and the pores are infiltrated with silicon, which is then converted by heat treatment to silicon carbide, the residual porosity being set at less than 10%. The percentage of silicon carbide in the core body 1 should then amount to between 10 and 50%, with a maximum content of silicon not converted to silicon carbide of 10%. With the above slight residual porosity a high thermal conductivity and heat capacity is achieved; furthermore, a friction facing of this kind performs well when wet. The infiltration process using fluid silicon makes it possible to produce a dense material not just at the surface but throughout the entire volume, so that a friction body built up in this manner has optimal properties throughout its structure, i.e., even after a certain amount of wear on the friction surface.

Inasmuch as there is present in the core body a content of silicon that has not been converted to silicon carbide, it is possible to achieve short periods of stay in the furnace, on the one hand, and on the other band the limitation of the silicon not converted to silicon carbide to about 10%, additional silicon is available in the bonding layer when the bodies are assembled together.

To promote the removal from the core body 1 of heat that is transferred to the core body 1 through the friction body 2, a thermally conductive substance is added to the core body 1. This thermally conductive additive can be incorporated either during the formation of the core body 1 but before the pyrolysis, or it is embedded into the pores of the pyrolyzed body together with the fluid silicon during the infiltration, or in a subsequent process step.

In contrast to the core body 1, which is to have high mechanical stability as well as good heat capacity and thermal conductivity, the friction bodies 2 are so constructed and adapted as regards their material properties that they have an optimized frictional property, and furthermore withstand the high temperatures occurring at the surfaces, for example during a braking action. For this reason the friction bodies 2 are formed from a carbon fiber-reinforced, porous carbon body which is infiltrated with fluid silicon to form an extremely dense material surface, especially one with a dense surface. Such a friction body is thus capable of withstanding temperatures up to 2,000° C. at its surface. In order furthermore to support the frictional properties of the friction bodies 2 and to define them, friction reducing or friction increasing additives can be incorporated into the structure of the friction body 2. Silicon carbide powder of a grain size of 0.3 to 3.0 μm is used as a friction increasing additive. Such a powder can be controlledly incorporated into the structure of the friction body 2. It has been found, however, that an excessively high friction value does not result in any optimum frictional performance, or braking produces high-frequency sounds which is not acceptable in automobile manufacture. For this reason, friction reducing additives are also embedded in the friction bodies 2, enabling them to avoid this above-mentioned noise production.

Figure 5A:
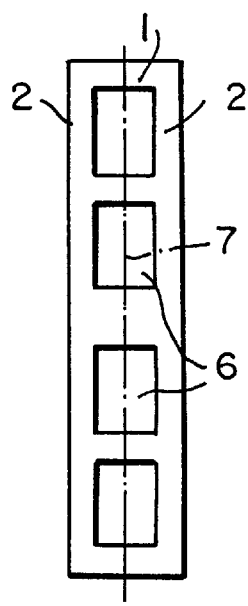
FIGS. 5A and 5B show a friction unit similar to the arrangement in FIGS. 3 and 4, in which cooling channels are formed.
Figure 5B:
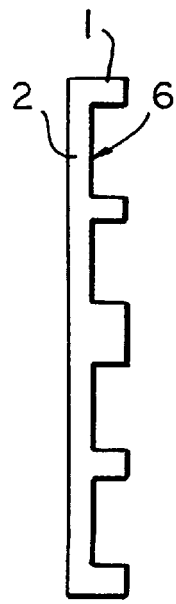

FIGS. 5A and 5B show a variant of a friction unit for use as a brake unit in which cavities or cooling channels 6 are formed in the core body 1 for air circulation and thus the internal ventilation of this brake unit. To form these cavities 6 the core body can be composed of two parts, as indicated by the dividing line 7 in FIG. 5A, or it can be made integral as shown in FIG. 5B. On the inside surfaces of such partial core bodies, grooves can be formed which after the assembly of the two partial core bodies along the line of junction 7 form the cavities 6. Such core bodies 1 can be joined together by a bonding method like the one used in joining the core body 1 to the friction body 2 as described above. As it can be seen in FIGS. 5A and 5B, such grooves can be provided in a simple manner in the prepared preliminary forms, for example, of the carbon fiber-reinforced carbon or graphite of which the core body 1 consists in its basic construction. If necessary, such cooling channels can be provided also on the exterior.

As it can be seen in FIGS. 3 and 4, the described sandwich construction of the friction unit offers the possibility of renovating such a friction unit after the friction body 2 has worn out, by processing the remanent core body 1, together with any thin residual layer of the friction body or bodies 2 thereon, by applying a fresh friction body 2 to the core body 1 or to the remanent layer of the friction body 2, using a procedure which is identical to the one used for making a new friction unit and represented in FIGS. 3 and 4. Theoretically, therefore, the core body 1 has an unlimited useful life due to the possibility of renovating it simply with a new friction body 2.

Figure 1A:
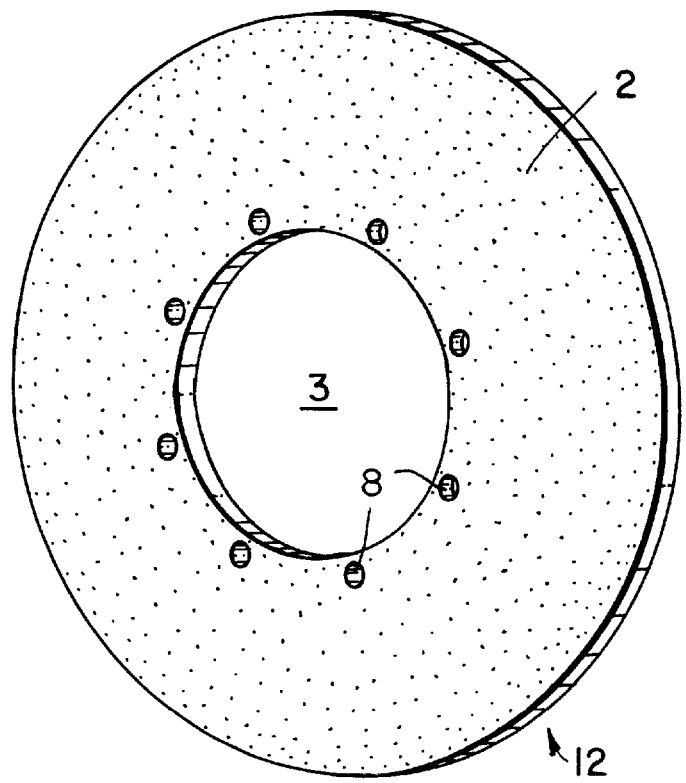
FIG. 1A is a photograph of a C/C—SiC brake disk for a motor vehicle.
Figure 1B:
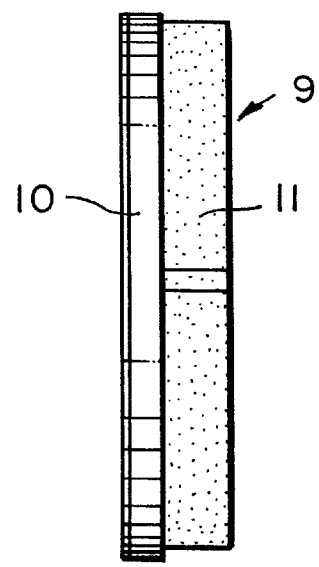
FIG. 1B is a representation of a brake shoe.
Figure 2:
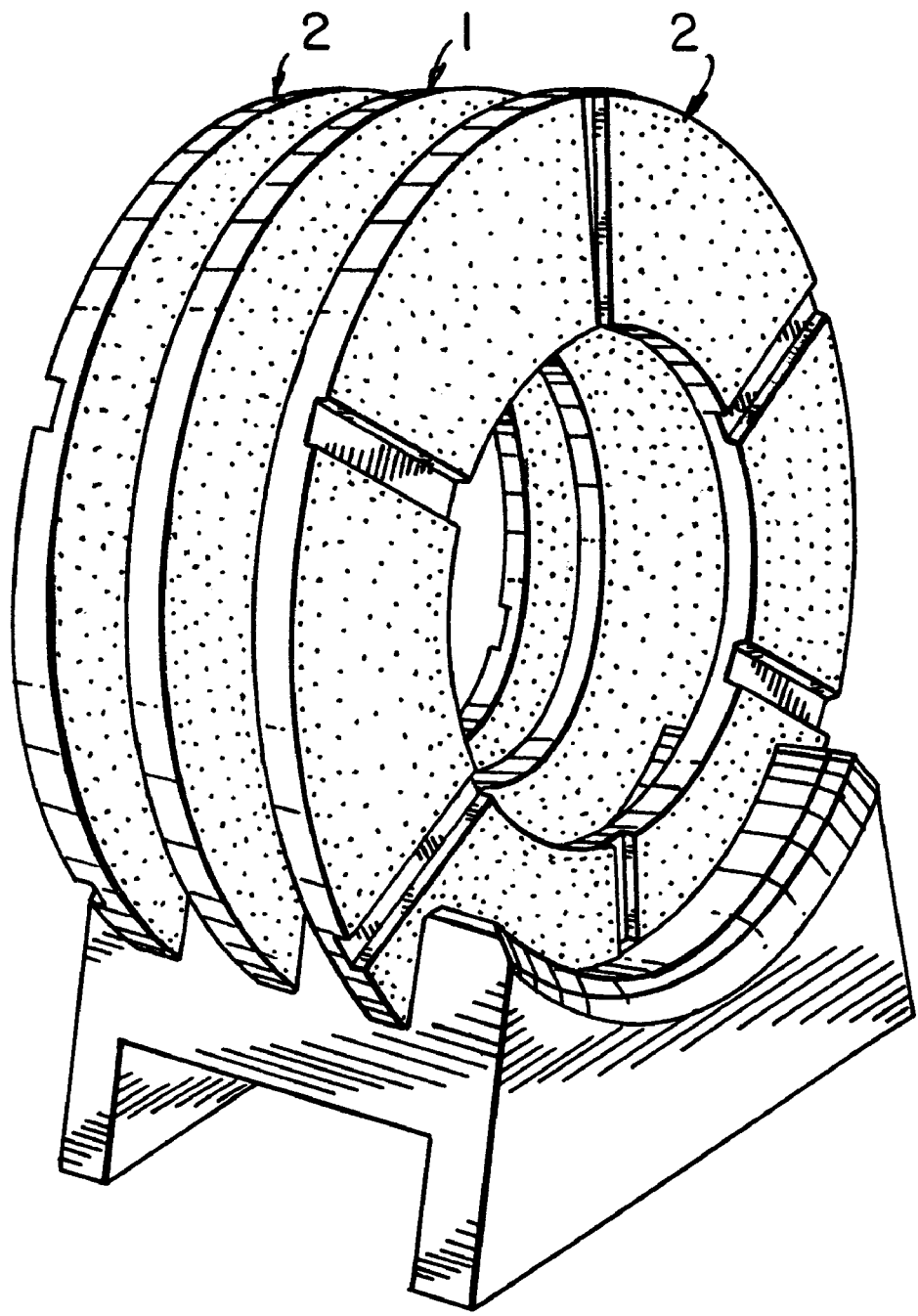
FIG. 2 is a photograph of a multiple-disk brake system such as can be used, for example in aircraft.

FIG. 1A shows a photograph of the brake disk represented in FIGS. 2 and 3, with a central opening 3 and a plurality of holes 8 distributed around the margin of the opening 3. Furthermore, there is shown in FIG. 1B a brake shoe 9 as a separate friction unit having a supporting plate 10 as well as a friction plate 11 serving as a friction body. The statements made above on FIGS. 3 and 4 apply both to the supporting plate 10 and to the friction plate 11. The friction plate 11, which serves as a friction body, is adapted in its material properties to the requirements corresponding to those of the friction plate 2 of the brake disk represented in FIG. 2 and explained above. The supporting plate 10 can be constructed like the core body 1 of FIG. 2; however, another supporting plate is suitable, for example in the form of a metal plate or a thermal insulating layer of zirconium oxide, for example, on which the friction plate 11 made of a carbon fiber-reinforced, porous carbon body filled with silicon and silicon carbide is fastened in a form-locking or force-locking manner, for example by a dovetail junction or by screws of metal or ceramic.

FIG. 2 shows a laminated structure of a friction unit with a stator-rotor-stator arrangement. In this design, rotating and stationary friction units (rotors and stators) are axially in tandem. The individual rotors and stators are composed each of core bodies and bilaterally applied friction bodies each joined together by the refractory bonding layer according to the invention. Furthermore, in this figure radial recesses forming fastening grooves are present on the outer faces of the outside friction units. Such a friction unit, as represented in FIG. 2, can be modularly composed by preparing a plurality of core bodies 1 and friction bodies 2 and put together according to the requirements of such a multiple unit. Again, the material properties of the core bodies and friction bodies can be adapted to requirements, i.e., on the one hand for good thermal conductivity and mechanical stability (core bodies) and on the other hand for an optimized friction coefficient, of course also providing for good thermal conductivity.

The arrangement as represented in FIG. 2 forms a rotor and two stators, wherein the rotor is driven by the wheel of an aircraft. The rotor disk engages fixed stators of the brake unit. The braking is produced by hydraulic pressure of the disks against one another, while temperatures of up to 2,000° C. are reached in the surface of the friction body 2. The silicon-infiltrated carbon fiber-reinforced, porous carbon body has the advantage that it is resistant to oxidation due to the inner oxidation protection of the SiC, i.e., it is characterized by an extreme resistance to heat and corrosion.

The embodiment of a friction unit represented in FIG. 6 has two friction bodies 2 in disk form, which are joined together by a plurality of bridges 25 forming the core body 1, by means of a refractory bonding layer 4, the individual bridges 25 being each interposed into grooves which are formed in the friction bodies 2. The friction unit rotates, as indicated by the arrow 23, about the axis 24. The bridges 25 form the contour of cooling channels, which are of spiral shape, for example.

FIG. 7 shows a perspective view of a brake disk 12 according to the invention, which is composed of a core body 1 and two friction bodies 2. As it can be seen in FIG. 7, on the outside of the core body 1 of this brake disk 12 a boss 13 with connection holes is formed, which is integral with the core body 1. As already explained with reference to FIG. 5, it is possible to shape the core body 1 in the raw state to its final configuration, especially if it is formed of carbon fiber-reinforced carbon, before it in a single production operation without substantial reworking of the finished unit such receiving and joining parts can be manufactured. On the outer side of this profiled core body 1 the friction body 2 is applied by means of the described bonding layer 4 and can be replaced, after it is worn out, by the bonding technique according to the invention. A brake disk 12, as represented in FIG. 7, can be bolted to a wheel hub 14 by means of the connection holes.

Figure 8:
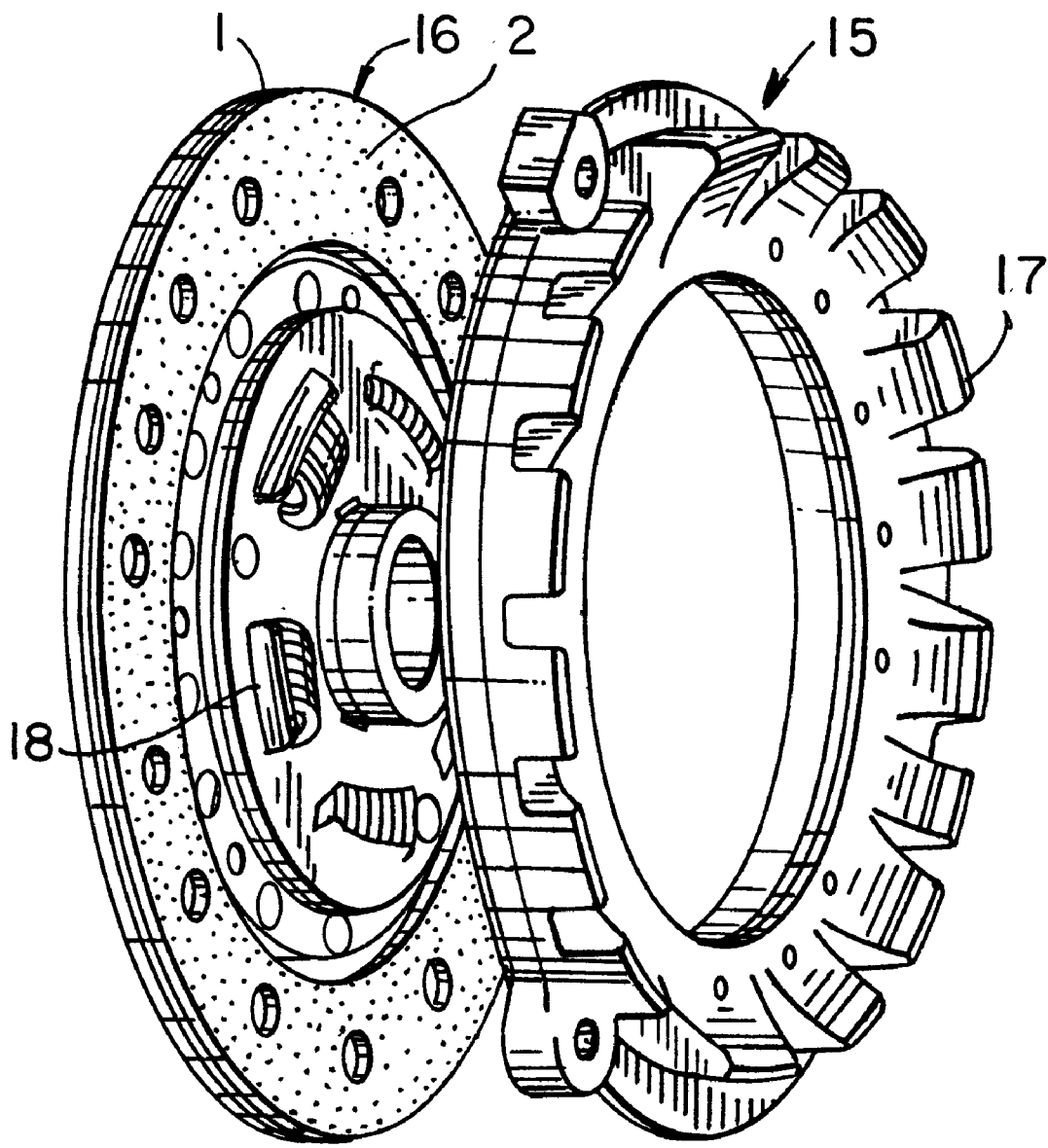
FIG. 8 is a perspective view of a friction clutch unit for a motor vehicle having a pressure plate, prior to assembly.

FIG. 8 shows an exploded view of a friction unit in the form of a clutch with a clutch plate 16 and a pressure plate 17. The clutch plate 16 is composed of a core body 1 and a friction body 2, the friction body 2 engaging a corresponding friction surface of the pressure plate 17 when the clutch is engaged. In this case also, the friction body 2 can be replaced with a new friction body 2 when it is worn out. Furthermore, in this clutch unit 15 a hub 18 of the clutch plate 16 is anchored to the core body 1 or incorporated into the matrix structure, and is mounted on a drive shaft or driven shaft which is not represented.

Brake disks have been tested in high-performance brakes which were constructed as shown in FIG. 1. Such disks had an outside diameter 19 of about 280 mm, a diameter 20 of the mounting opening of about 120 mm, and a total thickness 21 of approximately 13 mm.

The data on the friction unit as shown in FIG. 2 were as follows:

64 fabric layers per friction unit, oriented perpendicular to the axis of rotation of the disks, high-strength carbon fibers were used, ceramic content approximately 35%, carbon content approximately 65%.

A very dense texture was found, which during use leads to the fact that hardly any water molecules enter it or these small amounts were able to evaporate quickly on the surface. Moisture acting on the friction coating shows no influence on the frictional action. SiC and Si particles which embed themselves into the friction surface with the carbon detritus result in very high wear resistance. The friction values ($\mu$) reach as high as 1.0.

The terms and expressions which have been employed are used as terms of description and not of limitation, and there is no intention in the use of such terms and expressions of excluding any equivalents of the features shown and described or portions thereof; it being recognized that various modifications are possible within the scope of the invention.

What is claimed is:

1. A friction element for frictional engagement with a counter-body, the friction element having at least one freely accessible friction surface, comprising:
   a core body;
   a friction body formed of a carbon fiber-reinforced, porous carbon body, the pores being at least partially filled with silicon and silicon carbide, the friction body having a plurality of sides at least one of which is a freely accessible friction surface, said friction body being permanently bonded to the core body on its side facing away from the friction surface by a refractory bonding layer, wherein said bonding layer containing silicon carbide, the content of which is above 50%.

2. The friction element of claim 1 wherein the counter-body is a brake or clutch body.

3. The friction element of claim 1 wherein the pores of the friction body are at least partially filled with silicon and SiC by infiltration of fluid silicon at a temperature above 1410° C. in an adjusted atmosphere.

4. The friction element of claim 1 wherein the core body has a plurality of surfaces and is bonded at two surfaces opposite one another, each to a friction body through a bonding layer containing silicon carbide.

5. The friction element of claim 1 wherein the core body has a porosity of 5 to 50%.

6. The friction element of claim 1 wherein the core body is formed of carbon.

7. The friction element of claim 1 wherein the core body is formed at least partially of carbon fibers.

8. The friction element of claim 1 wherein the entire core body is formed of carbon fibers which are stacked or wound in layers.

9. The friction element of claim 8 wherein the orientation of the fibers is different in adjacent layers.

10. The friction element of claim 9 wherein the fiber length is between 1 and 5 mm, and the short fibers have no preferred orientation.

11. The friction element of claim 1 wherein the core body is formed of silicon carbide or a mixture of silicon carbide and carbon.

12. The friction element of claim 1 wherein the pores of the core body are filled with silicon carbide and the residual porosity amounts to less than 10%.

13. The friction element of claim 12 wherein the content of silicon carbide in the core body is between 10% and 50%.

14. The friction element of claim 12 wherein the content of silicon in the core body is up to 10%.

15. The friction element of claim 1 wherein the bonding layer has a slurry additive which is formed of an organic binding agent with a residual carbon content of at least 40% and a fine-grain powder of carbon and/or silicon, the binding agent content being between 10 and 50%.

16. The friction element of claim 15 wherein the binding agent is a phenolic resin.

17. The friction element of claim 1 wherein the friction body is formed of carbon fibers which are stacked or wound in layers.

18. The friction element of claim 17 wherein the fibers in adjacent layers having differing orientations.

19. The friction element of claim 18 wherein the fibers have a length of 1 to 5 mm and the short fibers have no preferred direction of orientation.

20. The friction element of claim 1 wherein the friction body contains friction value reducing or friction value increasing additives.

21. The friction element of claim 20 wherein the friction value-reducing additive is boron nitride and/or aluminum phosphate.

22. The friction element of claim 20 wherein the friction value-increasing, additive is silicon carbide powder with a grain size of 0.3 to 3.0 $\mu$m.

23. The friction element of claim 1 wherein the friction body and/or the core body contains a heat-conductive additive.

24. The friction element of claim 23 wherein the heat-conductive additive is embedded in the pores.

25. The friction element of claim 1 wherein cooling channels are formed in the friction body and/or the core body.

26. The friction element of claim 1 wherein the core body has a porosity of 10 to 30%.

27. A method for the manufacture of a friction element for frictional engagement with a counter-body, the friction element having a plurality of sides at least one freely accessible friction surface, the element being formed of a friction body which is formed of a carbon fiber-reinforced, porous carbon body, and a core body bondable to one another, comprising:
   infiltrating the carbon body with fluid silicon at a temperature above 1410° C. in an adjusted atmosphere, and bonding the friction body on its side facing away from the friction surface to the core body by means of a refractory bonding layer, wherein said bonding layer containing silicon carbide, the content of which is above 50%.

28. The method of claim 27 wherein the core body is bonded at two surfaces opposite one another each with a friction body by a bonding layer containing silicon carbide.

29. The method of claim 27 wherein said core body has a porosity of 5 to 50%.

30. The method of claim 27 wherein the core body is a carbon body.

31. The method of claim 27 wherein the core body is formed at least partially of carbon fibers.

32. The method of claim 27 wherein the core body is formed of carbon fibers.

33. The method of claim 32 wherein the fibers are stacked or wound in adjacent layers and are oriented differently in said adjacent layers.

34. The method of claim 27 wherein the fibers have a length of from 1 to 5 mm and the short fibers have no preferred orientation.

35. The method of claim 27 wherein the core body is of silicon carbide or a mixture of silicon carbide and carbon.

36. The method of claim 27 wherein the silicon is infiltrated into the pores of the core body and is converted mainly into silicon carbide by a heat treatment, and the core body has a residual porosity of less than 10%.

37. The method of claim 27 wherein the silicon carbide is formed in the core body with a content between 10 and 50%.

38. The method of claim 27 wherein a content of up to 10% of the silicon not converted to silicon carbide is established in the core body.

39. The method of claim 27 wherein a slurry additive of an organic binding agent with a residual carbon content of at least 40% and a fine powder of carbon and/or silicon, in which the binding agent content is between 10 and 50%, is introduced into the bonding layer.

40. The method of claim 27 wherein the friction value reducing or friction value increasing additives are added to the friction body.

41. The method of claim 40 wherein the friction reducing additive is boron nitride and/or aluminum phosphate.

42. The method of claim 40 wherein the friction increasing additive is silicon carbide powder of a grain size of 0.3 to 3.0 μm.

43. The method of claim 40 wherein at least one of the friction body and the core body contains a highly heat-conductive additive.

44. The method of claim 27 wherein an insert of a porous, pyrolyzable material is interposed prior to formation of the bonding layer between the friction body and the core body.

45. The method of claim 44 wherein the insert is paper, cardboard, and/or paper felt.

46. The method of claim 44 wherein the insert has a thickness between 0.1 and 1 mm.

47. The method of claim 27 wherein an insert of a carbon fleece or a carbon mat is interposed prior to forming the bonding layer between the friction body and the core body.

48. The method of claim 27 wherein the friction element is a brake or clutch body.

49. The method of claim 27, wherein said core body has a porosity of 10 to 30%.

* * * * *

UNITED STATES PATENT AND TRADEMARK OFFICE
CERTIFICATE OF CORRECTION

PATENT NO.   : 6,042,935  Page 1 of 1
DATED        : March 28, 2000
INVENTOR(S)  : Krenkel et al.

It is certified that error appears in the above-identified patent and that said Letters Patent is hereby corrected as shown below:

<u>Title page,</u>
Item [73], Assignee, change "fuer" to -- für --; change "ung" to -- und --; and change "Cologne" to -- Köln --.

Signed and Sealed this

Twelfth Day of August, 2003

JAMES E. ROGAN
*Director of the United States Patent and Trademark Office*